United States Patent
Soeda et al.

(10) Patent No.: US 7,560,514 B2
(45) Date of Patent: Jul. 14, 2009

(54) THERMOPLASTIC ELASTOMER COMPOSITION HAVING MODERATE CURE STATE

(75) Inventors: Yoshihiro Soeda, Hiratsuka (JP); Andy Haishung Tsou, Houston, TX (US); Yoshiaki Hashimura, Hiratsuka (JP); Hiroyuki Kaidou, Hiratsuka (JP); Jerry Willie Ball, Conroe, TX (US)

(73) Assignees: ExxonMobil Chemical Patents Inc., Houston, TX (US); The Yokohama Rubber Co., Ltd., Tokyo (JP)

( * ) Notice: Subject to any disclaimer, the term of this patent is extended or adjusted under 35 U.S.C. 154(b) by 447 days.

(21) Appl. No.: 10/548,298

(22) PCT Filed: Mar. 6, 2003

(86) PCT No.: PCT/US03/06559

§ 371 (c)(1),
(2), (4) Date: May 18, 2006

(87) PCT Pub. No.: WO2004/081106

PCT Pub. Date: Sep. 23, 2004

(65) Prior Publication Data

US 2006/0235153 A1    Oct. 19, 2006

(51) Int. Cl.
*C08L 77/00* (2006.01)
*C08F 8/00* (2006.01)
(52) U.S. Cl. ...................... 525/178; 524/514
(58) Field of Classification Search ................. 525/178, 525/514
See application file for complete search history.

(56) References Cited

U.S. PATENT DOCUMENTS

| | | | |
|---|---|---|---|
| 5,013,793 A | 5/1991 | Wang et al. | |
| 5,453,465 A | 9/1995 | Yu et al. | |
| 5,574,105 A | 11/1996 | Venkataswamy | |
| 6,346,571 B1 * | 2/2002 | Dharmarajan et al. | 525/72 |
| 6,548,585 B1 * | 4/2003 | Ozawa et al. | 524/432 |

FOREIGN PATENT DOCUMENTS

| | | |
|---|---|---|
| EP | 0 857 761 A1 | 8/1998 |
| EP | 0 722 850 B1 | 5/1999 |
| EP | 0 969 039 A1 | 1/2000 |
| RU | 2107702 | 3/1998 |
| WO | WO 01/96476 A2 | 12/2001 |

OTHER PUBLICATIONS

PCT International Search Report for PCT/US03/06559 mailed on Nov. 14, 2003.
PCT International Preliminary Examination Report for PCT/US03/06559 mailed on Mar. 8, 2005.

* cited by examiner

*Primary Examiner*—Ana L Woodward
(74) *Attorney, Agent, or Firm*—Connolly Bove Lodge & Hutz LLP

(57) ABSTRACT

A thermoplastic elastomer composition comprising a dynamically vulcanized blend of (A) a partially cured halogenated isobutylene elastomer and (B) a polyamide, wherein a tensile modulus at 100% elongation of the halogenated isobutylene elastomer dispersed in the polyamide matrix is less than 0.60 MPa.

11 Claims, No Drawings

THERMOPLASTIC ELASTOMER COMPOSITION HAVING MODERATE CURE STATE

TECHNICAL FIELD

The present invention provides an improved thermoplastic elastomer composition having excellent durability and flexibility. In particular, the present invention relates to a thermoplastic elastomer composition, which is composed of a halogenated isobutylene elastomer dispersed in a polyamide matrix, having limited tensile modulus of the elastomer after vulcanization, that provides excellent low-temperature durability.

BACKGROUND ART

EP722850B1 disclosed a low-permeability thermoplastic elastomer composition that is superior as a gas-barrier layer in pneumatic tires. This thermoplastic composition comprises a low-permeability thermoplastic matrix, such as polyamides or blends of polyamides, in which a low-permeability rubber, such as brominated poly(isobutylene-co-paramethylstyrene) (i.e., BIMS) is dispersed. Subsequently, in both EP857761A1 and EP969039A1, viscosity ratio between the thermoplastic matrix and the rubber dispersion was specified as a function of the volume fraction ratio and independently to be close to one in order to achieve phase continuity in thermoplastic and fine rubber dispersions, respectively. Criticality of smaller rubber dispersions was recognized in EP969039A1 in these thermoplastic elastomers for delivering acceptable durability especially for their usage as innerliners in pneumatic tires. Also, the BIMS's cure state is desirable between 50% and 95% in EP969039A1.

SUMMARY OF INVENTION

The object of the present invention is to provide a thermoplastic elastomer composition having excellent durability and flexibility.

In accordance with the present invention, there is provided a thermoplastic elastomer composition comprising a dynamically vulcanized blend of (A) a partially cured halogenated isobutylene elastomer and (B) a polyamide, wherein a tensile modulus at 100% elongation of the halogenated isobutylene elastomer dispersed in the polyamide matrix is less than 0.60 MPa.

DISCLOSURE OF INVENTION

In this specification and in the claims which follow, the singular forms "a", "an" and "the" include plural referents unless the context clearly dictates otherwise.

According to the present invention, the improvement in low temperature durability of the low-permeability thermoplastic elastomers is achieved by controlling the tensile modulus at 100% elongation of the dispersed elastomer after vulcanization. Thus, the present invention relates to dynamically cured elastomer particles dispersed in the polyamide matrix of the thermoplastic elastomer film having excellent low temperature durability. More particularly, the present invention relates to the partially cured thermoplastic elastomer composition for producing a thermoplastic elastomer film having the tensile modulus at 100% elongation of the dispersed elastomer after vulcanization suitable for use as an air permeation preventive barrier such as an air permeation preventive layer of a pneumatic tire. The tensile modulus of the dispersed elastomer at 100% elongation is less than 0.60 MPa, preferably 0.59 MPa or less, preferably 0.58 MPa or less, 0.57 MPa or less, preferably 0.56 MPa or less.

Tensile modulus at 100% elongation is determined measuring the force modulation AFM according to the test method described in "Maria D. Ellul, et al. ACS Rubber 2001, Cleveland (i.e., Ref-1) then calculating the tensile modulus at 100%. Ellul, et al. reports the force modulation in millivolts and then the tensile modulus at 100% elongation must be calculated.

The force modulation is used in conjunction with tapping AFM. The topology of the sample is first mapped using the tappig mode. During force modulation, the cantilever tip is lowered by a specified 50 nm from the surface defined by tapping. The cantilever is then oscillated in its indentation mode at the bimorph resonant frequency of ~10 kHz. During scanning, a constant drive amplitude for the bimorph-driven force modulation is set at 500 mV and response RMS amplitudes of the cantilever are measured. Bimorph driven force modulation is a displacement modulation with reference to the tip holder. However, without the knowledge of the input tip amplitude (only the drive amplitude for the bimorph is known), the mechanical modulus of the sample cannot be calculated from the response amplitude. Instead, relative difference in response RMS amplitude between the rubber and Nylon in a given sample are measured for comparison in rubber hardness between samples.

Determination of tensile modulus from force modulation AFM amplitude is as follows. While the following example is directed to nylon and BIMS, one versed in the art will recognize that this procedure may be used with other thermoplastics and elastomers. One blend of Nylon and BIMS (brominated copolymer of isobutylene and paramethylstyrene) with BIMS fully cured (through curative saturation and long cure time) are prepared along with one blend of Nylon and BIMS but without any curatives (0% cure). By examining these two blends using force modulation AFM, a correlation is established between cure state and force modulation AFM amplitude (reported in mV) based on linear correlation assumption. Since tensile moduli of BIMS are known as a function of the cure state, the force modulation amplitude can thus be converted to 100% BIMS rubber tensile modulus. In the examples, serial and non-serial tensile moduli were averaged together to obtain the final tensile modulus at 100% elongation.

Tensile properties and tensile tests described herein are based on JIS K6251 "Tensile Test Method of Vulcanized Rubber."

The thermoplastic elastomer composition is a blend of a halogenated isobutylene elastomer and a polyamide, which is subjected to dynamic vulcanization, wherein the polyamide is present preferably at 5 to 75 parts by weight, more preferably 10 to 75 parts by weight and the elastomer is present preferably at 95 to 25 parts by weight, more preferably 90 to 25 parts by weight.

The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

Dynamic vulcanization is effected by mixing the ingredients at a temperature which is at or above the curing temperature of the elastomer in equipment such as roll mills, Banbury® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

In a preferred embodiment the halogenated isobutylene elastomer component include copolymers of isobutylene and para-alkyistyrene, such as described in European Patent Application 0 344 021, wherein the elastomer is a brominated copolymers of isobutylene and para-methyistyrene having 5 to 12 weight % para-methylstyrene, 0.3 to 1.8 mol % brominated para-methyistyrene, and a Mooney viscosity of 30 to 65 (1+4) at 125° C., as measured by ASTM D 1646-99. The copolymers preferably have a substantially homogeneous compositional distribution. Preferred alkyl groups for the para-alkyl styrene moiety include alkyl groups having from 1 to 5 carbon atoms, primary haloalkyl, secondary haloalkyl having from 1 to 5 carbon atoms and mixtures thereof. A preferred copolymer comprises isobutylene and para-methylstyrene.

Suitable halogenated isobutylene elastomer components include copolymers (such as brominated isobutylene-paramethylstyrene copolymers) having a number average molecular weight Mn of at least about 25,000, preferably at least about 50,000, preferably at least about 75,000, preferably at least about 100,000, preferably at least about 150,000. The copolymers may also have a ratio of weight average molecular weight (Mw) to number average molecular weight (Mn), i.e., Mw/Mn of less than about 6, preferably less than about 4, more preferably less than about 2.5, most preferably less than about 2.0. In another embodiment, suitable halogenated isobutylene elastomer components include copolymers (such as brominated isobutylene-paramethylstyrene copolymers) having a Mooney viscosity (1+4) at 125° C. (as measured by ASTM D 1646-99) of 25 or more, preferably 30 or more, more preferably 40 or more.

Preferred brominated copolymers of isobutylene and paramethylstyrene include those having 5 to 12 weight % paramethylstyrene, 0.3 to 1.8 mol % brominated para-methylstyrene, and a Mooney viscosity of 30 to 65 (1+4) at 125° C. (as measured by ASTM D 1646-99).

The halogenated isobutylene elastomer component (A) according to the present invention can be prepared from isobutylene and about 0.5 to 25% by weight, preferably about 2 to 20% by weight, based upon the total amount of the comonomer, of p-alkylstyrene, preferably p-methylstyrene, followed by the halogeration. The content of the halogen (e.g., Br and/or Cl, preferably Br) is preferably less than about 10% by weight, more preferably about 0.1 to about 7% by weight, based upon the total amount of the copolymer.

The compolymerization can be carried out in a known manner as described in, for example, European Patent Publication No. EPO-34402/A published Nov. 29, 1989 and the halogenation can be carried out in a known method as described in, for example, U.S. Pat. No. 4,548,995.

The halogenated isobutylene elastomer preferably has the number-average molecular weight ($\overline{Mn}$) of at least about 25,000, more preferably at least about 100,000 and a ratio of the weight-average molecular weight ($\overline{Mw}$) to the number-average molecular weight ($\overline{Mn}$), i.e., $\overline{Mw}/\overline{Mn}$ of preferably less than about 10, more preferably less than about 8.

The polyamides usable in the present invention are thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (Nylon 6), polylauryllactam (Nylon 12), polyhexamethyleneadipamide (Nylon 66), polyhexamethyleneazelamide (Nylon 69), polyhexamethylenesebacamide (Nylon 610), polyhexamethyleneisophthalamide (Nylon 6 IP) and the condensation product of 11-amino-undecanoic acid (Nylon 11). Nylon 6 (N6), Nylon 11 (N11), Nylon 12 (N12), a Nylon 6/66 copolymer (N6/66), Nylon 610 (N610), Nylon 46, Nylon MXD6, Nylon 69 and Nylon 612 (N612) may also be used. The copolymers thereof any blends thereof may also be used. Additional examples of satisfactory polyamides (especially those having a softening point below 275° C.) are described in Kirk-Othmer, Encyclopedia of Chemical Technology, v. 10, page 919, and Encyclopedia of Polymer Science and Technology, Vol. 10, pages 392-414. Commercially available thermoplastic polyamides may be advantageously used in the practice of this invention, with linear crystalline polyamides having a softening point or melting point between 160° C.-230° C. being preferred.

The elastomer composition according to the present invention may contain, in addition to the above-mentioned essential ingredients, a vulcanization or cross-linking agent, a vulcanization or cross-linking accelerator, various types of oils, an antiaging agent, reinforcing agent, plasticizer, softening agent, or other various additives generally mixed into general rubbers. The compounds are mixed and vulcanized by general methods to make the composition which may then be used for vulcanization or cross-linking. The amounts of these additives added may be made the amounts generally added in the past so long as they do not run counter to the object of the present invention.

EXAMPLES

The present invention will now be further illustrated by, but is by no means limited to, the following Examples.

The Tapping Phase and Force Modulation AFM procedure was as follows. All specimens were analyzed within 8 hours after cryofacing to prevent specimen relaxation. During cryofacing, the specimens were cooled to −150° C. and cut with diamond knives in a Reichert cryogenic microtome. They were then stored in a dessicator under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular Si cantilever. While the set point ratio is maintained at a value equal to or lower than 0.5, the contact set point was adjusted routinely to ensure repulsive contacts with positive phase shifts. The cantilever was running at or slightly below its resonance frequency.

The following commercially available products were used for the components employed in the Examples This invention further relates to a process to produce cured TPE's, that may be formed into air barriers, such as tire innerliners, comprising curing the TPE at a temperature less than 185° C., preferably between 180° C. and 183° C., preferably at 180° C.

1. Resin Component

Nylon: Nylon 11 (BESN, ATOFINA) and Nylon 6/66 (5033B, UBE) at approximately a three to two weight ratio 2. Elastomer Component
BIMS: Brominated copolymer of isobutylene and paramethylstyrene sold under the trade name EXXPRO 89-4 by ExxonMobil Chemical Company having a mooney viscosity of about 45, approximately 5 weight % para-methylstyrene, and approximately 0.75 mol % bromine
ZnO: Zinc oxide curative
St-acid: Stearic acid curative
ZnSt: Zinc sterate curative
3. Additives
Plasticizer—N-butylbenzenesulfonamide
Antioxidant—Irganox 1098, Tinuvin 622LD, and CuI Examples 1-2 and Comparative Example 1

Three blown films having the same composition shown in Table 1 were mixed by a twin screw extruder at a mixing temperature of 230° C. Then, those three blown films having the same composition shown in Table 1 were produced at an extruding temperature of 250° C. for example 1.2, and Comparative Example 1, using the same blown die. The tires of Example 1 and 2 were manufactured at 180° C. The tire of Comparative Example 1 was manufactured at 185° C. The cure state of Exxpro 89-4 of the thermoplastic elastomer films are as listed in Table 2. The films were subjected to a tire field test in Canada during winter season where temperature can reach −20° C. and below.

TABLE 1

Composition of the cast film

| Material | phr (parts per hundred of BIMS) |
|---|---|
| BIMS | 100 |
| ZnO | 0.15 |
| St-acid | 0.6 |
| ZnSt | 0.3 |
| Nylon | 68 |
| Plasticizer | 21 |
| Antioxidant | 0.5 |

The cure state was measured by Force Modulation AFM. Force Modulation Amplitude was measured for the examples. Example 1 had an FMA of 5.25 nm, example 2 had an FMA of 5.23 nm, and comparative example 1 had an FMA of 6.15 nm. This method was described in Ref.-1 mentioned above.

According to Ref.-1 test method, the of cure state the dispersed elastomer in the thermoplastic elastomer composition was in proportion to the cantilever vibration amplitude length of the Force Modulation AFM measurements. This means that higher tensile modulus at 100% elongation of the elastomer gives higher cantilever vibration amplitude.

Effect of Invention

Examples 1 and 2 and Comparative Example 1 were tested in the same test field (i.e., Canada). As shown in Table 2, if the tensile modulus at 100% elongation is less than 0.60 MPa, there are no cracks occurred in tire. Therefore, the present invention demonstrates that the desired performance can be obtained by reducing the tensile modulus at 100% elongation to less than 0.60 MPa and, the durability of tire could be improved in a thermoplastic elastomer blown film for the improvement in low temperature durability.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. A thermoplastic elastomer (TPE) composition comprising a dynamically vulcanized blend of a partially cured halogenated isobutylene elastomer and a polyamide where the tensile modulus of the elastomer dispersed in the polyamide is less than 0.56 MPa.

2. The TPE composition of claim 1 wherein the elastomer comprises a brominated copolymer of isobutylene and para-alkyl styrene.

3. The TPE composition of claim 1, wherein the elastomer comprises a copolymer of isobutylene and para-methyl styrene.

4. The TPE of claim 1, wherein the polyamide comprises one or more of Nylon 6, Nylon 66, Nylon 11, Nylon 69, Nylon 12, Nylon 610, Nylon 612, Nylon 46, Nylon MXD6, Nylon 6/66.

5. The TPE composition of claim 1, wherein the polyamide has a softening point of from 160 to 230° C.

TABLE 2

|  | Example 1 | | Comparative Example 1 | | Example 2 | |
|---|---|---|---|---|---|---|
|  | Tensile modulus at 100% elongation [MPa] | Durability | Tensile modulus at 100% elongation [MPa] | Durability | Tensile modulus at 100% elongation [MPa] | Durability |
| Curing temperature | 180° C. | | 185° C. | | 180° C. | |
| Serial | 0.56 | OK | 0.587 | NG | 0.529 | OK |
| Non-Serial | 0.514 | OK | 0.617 | NG | 0.541 | OK |
| Average | 0.537 | | 0.602 | | 0.535 | |

NG: Crack occurred.

6. The TPE composition of claim 1, wherein the polyamide is present at 5 to 75 parts by weight and the elastomer is present at 95 to 25 parts by weight.

7. The TPE composition of claim 1, wherein the elastomer has a number average molecular weight of at least about 50,000.

8. The TPE composition of claim 1, wherein the elastomer has an Mw/Mn of less than about 6.

9. The TPE composition of claim 1, wherein the elastomer has a Mooney viscosity (1+4) at 125° C. as measured by ASTM D 1646-99 of 25 or more.

10. The TPE composition of claim 1, wherein the elastomer is a brominated copolymers of isobutylene and para-methylstyrene having 5 to 12 weight % para-methylstyrene, 0.3 to 1.8 mol % brominated para-methylstyrene, and a Mooney viscosity of 30 to 65 (1+4) at 125° C. as measured by ASTM D 1646-99.

11. A process for producing cured thermoplastic elastomer (TPE) composition comprising shear mixing a partially cured halogenated isobutylene elastomer and a polyamide and curing the TPE at a temperature less than 185° C.

* * * * *